March 19, 1963 J. R. RACHLIN Re. 25,352
CEILING AIR FLOW ARRANGEMENT
Original Filed Sept. 16, 1958
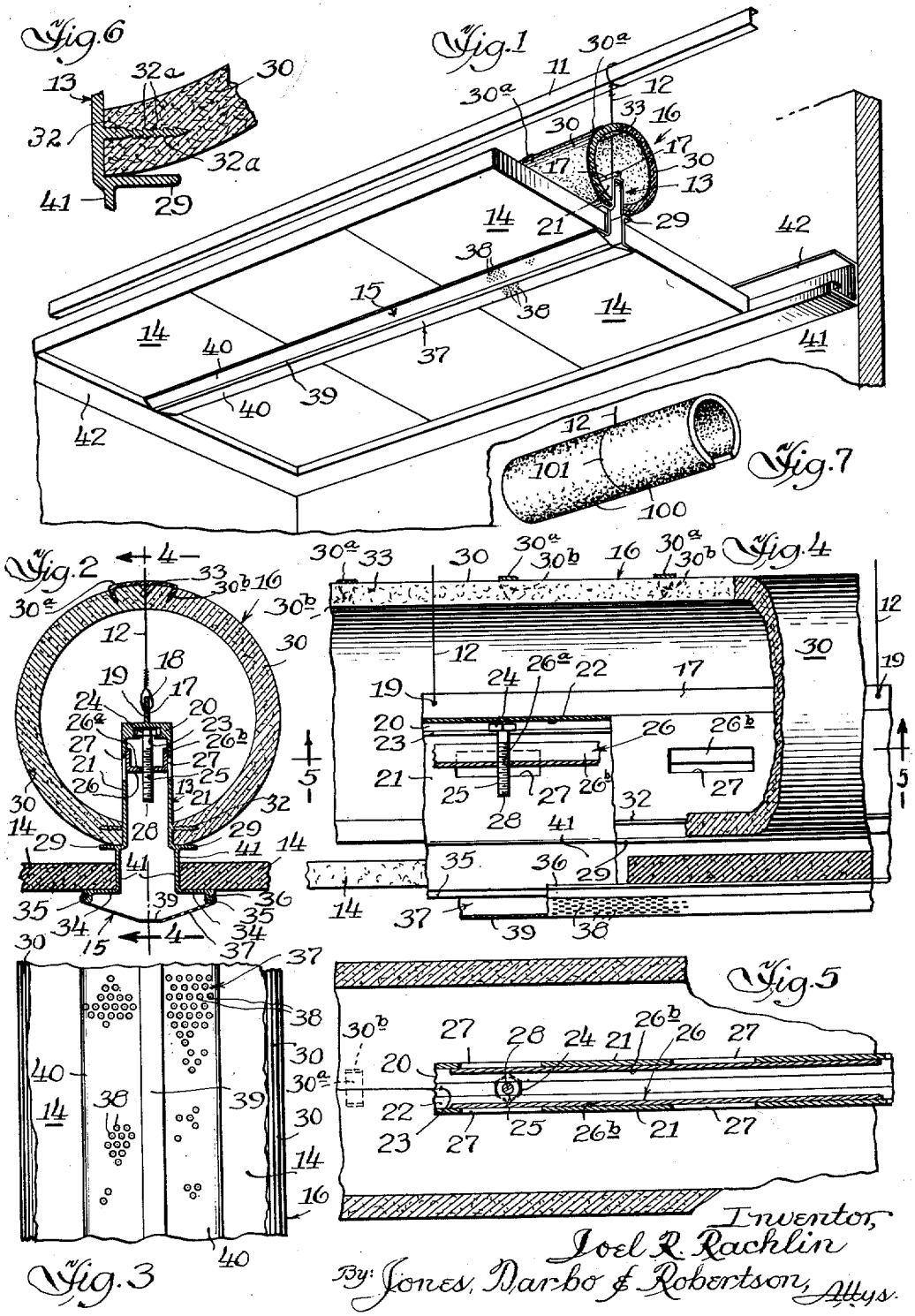
Inventor,
Joel R. Rachlin
By: Jones, Darbo & Robertson, Attys.

United States Patent Office

Re. 25,352
Reissued Mar. 19, 1963

25,352

CEILING AIR FLOW ARRANGEMENT

Joel R. Rachlin, Brookfield, Wis., assignor to Owens-Corning Fiberglas Corporation, a corporation of Delaware Original No. 2,937,589, dated May 24, 1960, Ser. No. 761,410, Sept. 16, 1958. Application for reissue Apr. 20, 1961, Ser. No. 105,257
19 Claims. (Cl. 98—40)

Matter enclosed in heavy brackets [ ] appears in the original patent but forms no part of this reissue specification; matter printed in italics indicates the additions made by reissue.

This invention relates to a ceiling air flow arrangement, and more particularly to that type of arrangement including a sub-ceiling suspended from a main ceiling with provision therebetween for air under slight but appreciable pressure, which air is then dispersed downwardly into the room for heating, cooling, or ventilating, through distribution means having an open or perforated area which is substantially less than the total area of the sub-ceiling, the latter preferably, but not necessarily, being constructed in whole or in part from acoustic tile.

In my application Serial No. 574,446, filed March 28, 1956, entitled "Air Flow Ceiling Arrangements," now Patent No. 2,859,681, dated November 11, 1958, I disclosed a ceiling of this type including a combined support beam and air outlet member of inverted channel shape for supporting an acoustic tile sub-ceiling and also for supporting the air distribution panel between the tile. Whereas, it is among other important objectives, a principal objective of the present invention to provide a combined support and outlet member for supporting not only the tile and the distribution panel but also an air duct in communication with the outlet member.

Another object of the present invention is the provision of a means for interlocking the outlet member with a split part of the duct for convenience and efficiency of assembly.

Still another object of the present invention is the provision of means carried by the outlet member for varying the air communication from the duct.

The foregoing, and other objects and advantages, will be apparent from the following description, taken together with the accompanying drawing, showing an illustrative embodiment of the invention and in which drawing—

FIGURE 1 is a perspective view of a portion of sub-ceiling incorporating one preferred form of the present invention;

FIGURE 2 is an enlarged cross-section through the duct and outlet member;

FIGURE 3 is a fragmentary bottom view of the structure of FIG. 2;

FIGURE 4 is a longitudinal section taken on the line 4—4 of FIG. 2;

FIGURE 5 is a longitudinal cross-section taken on the line 5—5 of FIG. 4 looking upwardly;

FIGURE 6 is an enlarged view of a detail of the assembly; and

FIGURE 7 shows an alternative construction of the duct member.

Referring in detail to the illustrative construction shown in the drawings, the numeral 11 indicates a ceiling beam that may be suitably supported from the main ceiling of a room by means not necessary to be here described. Suspended from the beam 11, as by wires 12, is the combined support and air outlet member 13.

In accordance with the present invention, the member 13, details of which will be later described supports not only the sub-ceiling tile 14 and the air distribution panel 15, but also a somewhat tubular duct 16 through which passes the wire 12 and is attached to an upper fin 17 on the outlet member 13, as at 18, in the form of a loop that is entered in a hole 19 in the upper fin.

The combined support and air outlet member or bar 13 is advantageously formed of extruded aluminum and is of inverted channel formation, as best seen in FIG. 2. Below its upper fin 17 is a rail-like portion 20 from which extend downwardly, on each side, walls 21. The rail-like portion 20 is longitudinally grooved, as at 22, the margins of which groove provide a downwardly opening restricted slot 23 and underly the head 24 of a drive screw 25, the shank of which depends through the slot 23 and passes threadedly through a suitable perforation 26a in a vertically movable channel piece 26 having sides 26b. Channel piece 26 has limited vertical movement between the outlet member walls 21, under the influence of the drive screw 25, to uncover more or less of the air openings 27 in each of the walls 21 of the outlet member. By insertion of a screw driver into a kerf 28 in the lower end of the screw 25 rotation of the screw, vertical motion of which is inhibited while rotation of the head 24 thereof in the groove 22 is permitted, raises or lowers the channel piece 26, the side walls 26b of which lap the openings 27 of the outlet member. Channel piece 26 serves as a means of air pressure control as later more particularly described.

Duct 16 is a slit along its bottom to receive outlet member 13, and the latter has a pair of oppositely extending lateral sills 29 that support the duct 16. The duct may be conveniently formed of two almost semi-cylindrical half sections 30, one each of which rests on a sill 29 respectively. The duct is advantageously formed of fiber, such as glass fiber or the like, and, to hold the half sections 30 together, the outlet member 13 has, just above the sills 29, a pair of laterally extending spur vanes 32 formed integrally therewith that have serrations or saw tooth formations 32a on their upper and lower surfaces, as best shown in detail in FIG. 6. The serrations act as barbs which enter in one direction into the fibrous material of the duct sections 30 and inhibit withdrawal, thus holding the sections together and to the outlet member. The duct halves 30 may be thus tightly held together not only to the outlet member 13 but also at their upper meeting face 33 where the wire 12 passes through, the wire being squeezed between the surfaces of the duct halves and the latter being held sufficiently closely together to avoid any air opening therebetween. Clips 30a having prong ends 30b are here shown for holding the duct segments 30 together, along their mating edges 33, if further holding means be required.

At its lower end, the outlet member 13 terminates in a pair of longitudinally extending lateral flanges 34 that receive the tile 14 thereon and on their outer lower margins have hook shape ribs 35 over which are snapped return bend margins 36 of the face member 37 of the air distribution panel 15. The face member 37 has the usual multi-perforations 38 therein. In order to avoid direct downward air streams from the distribution panel 15, the latter has an imperforate center strip 39 and laterally spaced inclined areas 40 in which the perforations 38 occur, this construction also adding to the ornamental appearance of the sub-ceiling. It will be seen that the tile 14 resting on the flanges 34 and adjacent the lower walls 41 of the outlet member 13 are desirably substantially closer together than the full width of the air distribution panel 15.

In practice, air for heating, cooling, or ventilating is pumped into the duct 16 by any suitable means not necessary to be here described. From thence the air passes through the restrictive openings 27 in the outlet member 13, which are in communication both with the duct and with the outlet member, and from the outlet member through the perforations 28 in the panel 15 downwardly into the room. For purposes well known in the art, the open area, by reason of the perforations 38, in the panel 15 is desirably greater than the open area provided by the apertures 27 into the outlet member 13, so that the air pressure within the outlet member is less than the air pressure in the duct 16, to effect a drop in pressure before the air enters the room, thereby to avoid objectionable drafts, the air entering the room at relatively low velocity and well distributed.

Desired variations in pressure differential between the duct 16 and the outlet member 13 and the rate of air flow through any portion of the air outlet member may be regulated by the screw adjustment means including the drive screw 25 for the channel piece 26. Raising the channel piece increases the effective areas of the openings 27 and thereby reduces the difference in pressure, while lowering the channel piece reduces the effective area of the opening and increases the difference in pressure. It will be understood that there may be and preferably are more than one of the drive screws 25 spaced apart along the length of the channel piece 26, it sufficing to show one herein.

The tiles 14, where they approach the room wall 41, are here shown supported by a finishing moulding 42.

As shown in FIG. 7, the duct 16 may be constructed of sections 100 each having only a single split and abutted in end to end relationship at longitudinally spaced intervals, as at 101, in which case the wires 12 pass between the sections 100. The duct, so split, is resiliently spread apart along the split portion for mounting in position on the outlet member. Tape may be used to seal all joints in the duct.

The size of the duct 16 may be varied to suit a particular installation, and there may be one or more of the assemblies shown for a given room or space. Usually, spaced parallel ducts are provided to properly distribute the air as it is introduced into the room.

The invention is not intended to be limited to details of construction shown for purposes of illustration, and furthermore, it may not be necessary in all arrangements to employ all features of the invention conjointly, since various combinations and sub-combinations may at times be advantageously employed. Such changes may be made as fall within the scope of the appended claims without departing from the invention.

What is here claimed is:

1. In a forced-air distributing system for room heating, cooling, ventilation and the like, an elongated air distributing channel, said channel having side walls provided with spaced marginal apertures along the length of the upper portion thereof and defining a downwardly facing channel opening, means for supporting said channel open side downward beneath the ceiling of a room, a reticular air distribution panel carried along the length of said channel covering said channel opening, an enclosed air duct extending substantially throughout the length of said channel and mounted upon and supported by said channel, said air duct defining at least one opening therein receiving the apertured side walls of said channel and accommodating same within the interior confines of said duct with said channel opening and said distribution panel positioned externally of and below said duct, whereby forced air may be circulated in a closed path between said duct and said channel and be distributed uniformly through said distribution panel.

2. A combination air distributing and ceiling tile supporting member for use with a forced-air distributing system comprising a hollow air distributing channel defining in end-wise aspect a generally U-shaped perforate body portion having spaced side walls and lateral oppositely disposed ceiling tile supporting flanges extending from the distal ends of said side walls for supporting the marginal edges of adjacent ceiling tiles, means for suspending said combination air distributing and ceiling tile supporting member in inverted U-shaped position beneath the ceiling of a room, a perforate air distributing panel extending between said side walls across the open portion of said U-shaped body portion, and a forced-air duct of elongated tubular construction carried by said air distributing channel having a wall defining an opening receiving the non-flanged portion of said side walls therethrough and housing same in enclosed relationship within the hollow interior of said duct, whereby forced-air may pass in an enclosed path between said duct and said air distributing channel and be uniformly distributed through said air distributing panel.

3. In a forced-air distributing system suitable for heating, cooling and ventilation and the like, an elongated tubular air distributing member adapted to be suspended beneath the ceiling of a room, said air distributing member defining a generally U-shaped configuration in end-wise aspect and comprising a hollow stem portion having perforate spaced side walls defining therebetween an open side extending lengthwise along one end of said stem portion; a perforate air distributing panel fastened to said side walls across said open side; an elongated tubular forced-air duct defining a wall opening shaped to receive said perforate side walls of said stem portion therethrough and enclose same within the hollow interior of said duct with the open side of said stem portion being disposed exteriorly of said duct, whereby forced-air may circulate in an enclosed path between said tubular air distributing member and said tubular duct and be uniformly distributed through said air distributing panel.

4. The structure defined in claim 3 including hanger means for suspending said air distributing member beneath the ceiling of a room, said hanger means being attached to said air distributing member along the length thereof and passing radially through the wall of said air duct.

5. The structure defined in claim 3, wherein said forced-air duct is shaped in the form of a cylindrical conduit defining a longitudinal slit of sufficient size throughout the length thereof to receive the perforate side wall portions of said air distributing channel into the interior of said duct.

6. The structure defined in claim 3, wherein said air distributing member includes integral sills extending laterally in opposite directions from the side walls thereof and gravitationally supporting said forced-air duct.

7. The structure defined in claim 3, wherein said forced-air duct is fabricated from a fibrous material and the air distributing member includes integral spur vanes extending laterally in opposite directions from the median portion of the side walls thereof and embedded within the walls defining the wall opening in said air duct.

8. In a forced-air distributing system for room heating, cooling, ventilation and the like, an elongated air distributing channel, means for supporting said channel beneath the ceiling of a room, said channel having side walls provided with spaced apertures along the marginal length remote from the distal ends thereof, a reticular air distributing panel covering the opening formed by the distal ends of said walls of said channel between said side walls, an elongated air duct carried lengthwise upon said air distributing channel, said air duct defining an open wall area therein receiving the apertured side walls of said channel radially through the wall of and into the interior confines of said air duct, adjustable damper means carried by said air distributing channel for varying the rate of flow of forced-air between said air duct and said air distributing channel, whereby forced-air may be circulated between said duct and said air distributing channel and distributed through said distribution panel.

9. The structure defined in claim 8, wherein said adjustable damper means comprises an elongated channel-shaped damper nested with and carried by said air distributing channel, said damper being mounted for movement relative to the apertured side walls of said air distributing channel, and adjustable means operatively associated with said damper for imparting variable movements to said damper to move same between alternative positions opening and closing said side wall apertures to thereby regulate the flow of air passing through said side wall apertures between said air duct and said air distributing channel.

10. In a forced-air distributing system for room heating, cooling, ventilation and the like, an elongated hollow air distributing channel adapted to be supported beneath the ceiling of a room, said channel having apertures along the length of the upper portion thereof, and an enclosed air duct fabricated from a fibrous insulating material extending along the length of said channel and mounted upon and supported by said channel, said air duct defining at least one opening therein receiving the apertured side walls of said channel into the interior confines of said duct, whereby forced-air may be circulated between said duct and said channel.

11. The structure defined in claim 10 and including hanger means for supporting the air distributing channel beneath the ceiling of a room, said hanger means being attached to said air distributing channel at intervals along the length thereof and passing radially through the wall of said duct.

12. The structure defined in claim 11, wherein the air duct is in the form of a cylindrical conduit longitudinally slit throughout the length thereof along diametrically opposite lines to form half-duct sections and the air distributing channel is arranged between the edges of one slit in said duct, the hanger means passing through said duct at the other slit therein, and fastening means for holding the half-duct sections together in complementary relationship.

13. The structure defined in claim 11, wherein the air duct comprises a series of coaxially connected individual lengths of duct, each said length being in the form of a cylindrical conduit longitudinally slit along one side throughout the length thereof and open at said slit sufficiently to receive the air distributing channel between the edges of said duct formed by said slit, and the hanger means pass through said air duct at the junctures of the several lengths of duct.

14. An air distributing and ceiling tile supporting channel comprising an elongated inverted channel-like structure having apertures in the upper portion along the length thereof, sills extending laterally in opposite direction from the sides of said channel, spur vanes spaced above said sills and extending laterally in opposite directions from the sides of said channel, flanges spaced beneath said sills and extending laterally in opposite directions from the sides of said channel, said sills, vanes and flanges being integral with said channel.

15. In combination with air distributing and ceiling tile supporting channel as defined in claim 14, adjustable damper means carried by said channel for variably opening and closing the apertures in said channel-like structure.

16. A ceiling air distributing channel comprising an elongated inverted channel-like structure defining spaced apertures along the length of the upper portion thereof, sills extending laterally in opposite directions from the median portion of said structure, spur vanes spaced above said sills and extending laterally in opposite directions from the medial portion of said structure, flanges extending laterally in opposite directions from the bottom of said structure, said sills, vanes and flanges being integral with said structure, in combination with an elongated tubular duct fabricated from a fibrous noise-deadening material carried by said structure upon said sills and having a lengthwise slit therein receiving the upper portion of said structure therethrough, the walls defining said slit being impaled on said spur vanes, and with ceiling tile panels gravitationally supported by the flanges on said structure.

17. A ceiling air distributing channel comprising an elongated inverted channel-like structure having apertures in the upper portion along the length thereof, the top of said channel having therein a groove extending throughout the length of said channel and having a restricted mouth opening downwardly therewithin, a channel piece having vertical side flanges extending the length of said channel therewithin at approximately the level of the apertures therein, and screws having heads retained within said groove and depending therefrom at spaced intervals throughout the length of said channel, said screws being rotatably supported but held against axial movement and threadedly passing through said channel piece to support the same and to provide means for adjustment of the level of said channel piece within said channel structure to vary the effective openings of said apertures.

*18. In a forced-air distributing system for room heating, cooling, ventilating and the like, an elongated hollow air distributing member extending uninterruptedly across and spaced beneath the main ceiling of a room, said member defining an open air passageway therethrough continuously along the length thereof, an enclosed air duct extending beneath said main ceiling and along the entire length of and above said member, the wall of said air duct defining a longitudinally extending elongated opening thereinto from end to end, flange means on said member for coupling with said air duct with the opening into said air duct communicating with the open air passageway in said member throughout the lengths thereof, means for supporting said member and said duct in position beneath said main ceiling and means on said member for supporting adjacent elements of a sub-ceiling whereby air may be passed between said duct and said room beneath said sub-ceiling through said member.*

*19. In a forced-air distributing system for room heating, cooling, ventilating and the like, an elongated hollow air distributing member extending uninterruptedly across and spaced beneath the main ceiling of a room, said member defining an open, vertical air passageway therethrough continuously along the length thereof, an enclosed air duct extending beneath said main ceiling and along and above the entire length of and in mating relationship with said member, said air duct having a continuous opening formed therein and extending from end to end thereof, the portions of said duct which define such opening embracing the upper end of the open air passageway in said member, and said continuous opening of said duct being in air communication with the open air passageway of said member throughout their lengths, means for supporting said member spaced from and beneath said main ceiling, means on said member for supporting said duct above said member and means on opposite sides of the lower portion of said member for supporting the edges of adjacent elements of a sub-ceiling, whereby air may be passed between said duct and said room beneath said sub-ceiling through said member along the entire length thereof.*

References Cited in the file of this patent of the original patent

UNITED STATES PATENTS

| | | |
|---|---|---|
| 1,550,714 | Stacey | Aug. 25, 1925 |
| 2,172,771 | Norris | Sept. 12, 1939 |
| 2,221,001 | Lucius | Nov. 12, 1940 |
| 2,564,334 | Kennedy | Aug. 14, 1951 |
| 2,568,044 | Wallen | Sept. 18, 1951 |
| 2,833,199 | Wakefield | May 6, 1958 |
| 2,845,854 | Kurek | Aug. 5, 1958 |
| 2,960,602 | Kurth | Nov. 15, 1960 |